US010508182B2

(12) United States Patent
Sigmund et al.

(10) Patent No.: US 10,508,182 B2
(45) Date of Patent: Dec. 17, 2019

(54) DURABLE SUPERHYDROPHOBIC SURFACES

(71) Applicant: University of Florida Research Foundation, Inc., Gainesville, FL (US)

(72) Inventors: Wolfgang M. Sigmund, Gainesville, FL (US); Shu-Hau Hsu, Gainesville, FL (US); Ravi Kumar Vasudevan, Somerville, MA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 92 days.

(21) Appl. No.: 15/327,508

(22) PCT Filed: Jul. 24, 2015

(86) PCT No.: PCT/US2015/041972
§ 371 (c)(1),
(2) Date: Jan. 19, 2017

(87) PCT Pub. No.: WO2016/060723
PCT Pub. Date: Apr. 21, 2016

(65) Prior Publication Data
US 2017/0158831 A1    Jun. 8, 2017

Related U.S. Application Data

(60) Provisional application No. 62/029,141, filed on Jul. 25, 2014.

(51) Int. Cl.
  *C08J 5/18* (2006.01)
  *C08J 7/06* (2006.01)
  *C08J 7/12* (2006.01)

(52) U.S. Cl.
  CPC ............... *C08J 5/18* (2013.01); *C08J 7/065* (2013.01); *C08J 7/12* (2013.01); *C08J 2383/04* (2013.01)

(58) Field of Classification Search
  CPC ............. C08J 5/18; C08J 7/12; C08J 2383/04
  See application file for complete search history.

(56) References Cited

U.S. PATENT DOCUMENTS 8,574,713 B2  11/2013  Rutledge et al.
8,614,003 B2  12/2013  Ma et al.
(Continued)

FOREIGN PATENT DOCUMENTS

CN  101537682  9/2009
CN  101549552  10/2009
(Continued)

OTHER PUBLICATIONS

Balu, B. et al., "Fabrication of 'Roll-off' and 'Sticky' Superhydrophobic Cellulose Surfaces via Plasma Processing," *Langmuir*, 2008, pp. 4785-4790, vol. 24, No. 9.
(Continued)

*Primary Examiner* — Hai Vo
(74) *Attorney, Agent, or Firm* — Timothy H. Van Dyke; Beusse, Wolter, Sanks & Maire PLLC

(57) ABSTRACT

A superhydrophobic appliance is an elastomeric material with a surface having a multiplicity of re-entrant features. The elastomeric material can be a polydimethylsiloxane network. The superhydrophobic appliance can be formed by infusing a portion of a polydimethylsiloxane polymeric precursor partially into the pores of a porous membrane, curing to the polymeric network, and separating the membrane from the appliance to expose the superhydrophobic surface. The superhydrophobic surface can be subsequently modified to form a fluorinated surface that is oleophobic or superoleophobic in addition to being superhydrophobic.

13 Claims, 3 Drawing Sheets

(56) References Cited

U.S. PATENT DOCUMENTS

| | | | |
|---|---|---|---|
| 2007/0135007 A1* | 6/2007 | McCarthy | B05D 1/185 442/123 |
| 2009/0011222 A1 | 1/2009 | Xiu et al. | |
| 2010/0047523 A1* | 2/2010 | Kim | B05D 5/08 428/144 |
| 2010/0252177 A1* | 10/2010 | Sargent | C09J 7/00 156/152 |
| 2010/0303119 A1* | 12/2010 | Mayers | H01S 3/05 372/53 |
| 2011/0229667 A1 | 9/2011 | Jin et al. | |
| 2013/0216784 A1 | 8/2013 | Zhang et al. | |
| 2013/0230695 A1 | 9/2013 | Sigmund et al. | |
| 2014/0011013 A1 | 1/2014 | Jin et al. | |

FOREIGN PATENT DOCUMENTS

| | | |
|---|---|---|
| WO | WO 2013/188958 | 12/2013 |
| WO | WO 2014/012039 | 1/2014 |

OTHER PUBLICATIONS

Cassie, A.B.D. et al., "Wettability of Porous Surfaces," *Transactions of the Faraday Society*, 1944, pp. 546-550, vol. 40.

Gao, L. et al., "Wetting 101°," Langmuir, 2009, pp. 14105-14115, vol. 25. No. 24.

Hsu, S-H. et al., "Artificial Hairy Surfaces with a Nearly Perfect Hydrophobic Response," *Langmuir*, 2010, pp. 1504-1506, vol. 26, No. 3.

Li, X-M. et al., "What do we need for a superhydrophobic surface? A review on the recent progress in the preparation of superhydrophobic surfaces," *Chem. Soc. Rev.*, 2007, pp. 1350-1368, vol. 36.

Sui, G. et al., "Solution-Phase Surface Modification in Intact Poly(dimethylsiloxane) Microfluidic Channels," *Anal. Chem.*, 2006, pp. 5543-5551, vol. 78, No. 15.

Tuteja, A. et al., "Designing Superoleophoic Surfaces," *Science*, 2007, pp. 1618-1622, vol. 318, No. 5856.

Wenzel, R.N., "Resistance of Solid Surfaces to Wetting by Water," *Industrial and Engineering Chemistry*, 1936, pp. 988-994, vol. 28, No. 8.

Lin, et al., Enhancement of water-repellent performance on functional coating by using the Taguchi method, "Surf. Coat. Tech.", pp. 5253-5258, vol. 200 (2006).

Mertaniemi, et al., Functionalized porous microparticles of nanofibrillated cellulose for biomimetic hierarchically structured superhydrophobic surfaces, "RSC Adv.", pp. 2882-2886, vol. 2 (2012).

Ogihara, et al., Simple Method for Preparing Superhydrophobic Paper: Spray-Deposited Hydrophobic Silica Nanoparticle Coatings Exhibit High Water-Repellency and Transparency, "Langmuir", pp. 4605-4608, vol. 28 (2012).

* cited by examiner

DURABLE SUPERHYDROPHOBIC SURFACES

CROSS-REFERENCE TO RELATED APPLICATIONS

This application is the U.S. national stage application of International patent application No. PCT/US2015/041972, filed Jul. 24, 2015, which claims the benefit of U.S. Provisional Application Ser. No. 62/029,141, filed Jul. 25, 2014, the disclosures of which are hereby incorporated by reference in their entireties, including all figures, tables and drawings.

BACKGROUND OF INVENTION

Surface cleaning and repair of the surface of, for example, buildings, vehicles, and energy collection devices, are time-consuming and costly, and a surface with an inherent repellency of water, oil, and dirt can be a significant advantage. Surface wetting is governed by surface-energy parameters between the surface and the contacting liquid or solid surface. Where the sum of the free surface energies of the contacting materials components is very low, adhesion between these materials is weak. Hence, it is generally beneficial to lower the free surface energy of an edifice if one hopes to ignore its cleaning and repair. Non-stick materials, such as perfluorinated hydrocarbons have very low surface energies, and few materials adhere to Teflon®. The wetting of these low surface energy materials is reflected in the contact area that is observed between the surface of the low surface energy solid and a wetting material. The interactions between these materials generally result from van der Waals forces.

Nature diminishes the interaction of a surface of a solid and water without resorting to materials with surface energies as low as Teflon®. This is achieved by reducing the amount of the surface that contacts the water. For example, lotus leaves, cabbage leaves, and various fruits are covered by small wax bumps that reduce the van der Waals contact area presented to a water droplet, which forms due to its high surface tension, and significantly reduces the adhesion of the droplets to the surface. A superhydrophobic textured surface displays a water contact angle that exceeds 150° and displays a low sliding angle, which is the critical angle from horizontal of the inclined surface where a water droplet of a defined mass rolls off the inclined surface. This "Lotus effect" provides a self-cleaning surface, as contact water droplets adhere to dust particles and, to a much lesser degree, to some oils that are poorly adhered to the surface, to allow the "dirt" to be carried away as the water droplet rolls from the surface. Most oils are not readily removed from hydrophobic surfaces as the enlarged surface area increases the effective van der Waals interface and the Lotus-effect surface does not repel oils that interact less favorably with water than with the superhydrophobic surface.

Oil repellent surfaces are an engineering challenge because the surface tensions of oily liquids are usually in the range of 20-30 mN/m. The essential criterion for having a surface with superoleophobicity is to maintain oil drops in a Cassie-Baxter (CB) state, one where vapor pockets are trapped underneath the liquid. The CB state is dependent on the surface's structure and the surface energy of the material. If the structure and surface area are insufficient, the meta-stable energetic state is transformed into a Wenzel state, which displays wetting of the structure. The geometric structures that allow a CB state have re-entrant features, such as mushroom heads, micro-hoodoos, or horizontally aligned cylindrical rods. A re-entrant structure implies that a line drawn vertically, from the base solid surface through the geometric feature, must proceed through more than one solid gas interface of that feature.

One problem with these superhydrophobic or superoleophobic structures is a lack of durability. To this end, a material that has a long life when exposed to the environment without loss of the shape and surface functionality is desired, because durability is critical for successful implementation of a superhydrophobic or superoleophobic application.

BRIEF SUMMARY

Embodiments of the invention are directed to superhydrophobic appliances that are an elastomeric polymeric network with at least one surface with re-entrant features that render the surface superhydrophobic. The re-entrant features have at least one dimension of 100 µm or less, for example the diameter, and extend from a base of the surface at a plurality of angles from about 0° to about 180°. In an embodiment of the invention, the polymeric network is a polydimethylsiloxane network. The silicone appliance can have a fluorocarbon comprising monolayer on the surface of at least the re-entrant features to render the superhydrophobic surface oleophobic or superoleophobic in addition to being superhydrophobic.

Other embodiments of the invention are directed to a method of preparing superhydrophobic appliances. A mold, for example, a membrane comprising a multiplicity of pores of the desired re-entrant feature's cross-section is contacted with a polymeric precursor with the polymeric precursor being forced into the pores and cured into a polymeric network, deriving the shape of cured re-entrant structures from the shape of the pores. The infusion into the mold can be promoted by the application of a sufficient pressure differential at the interface of the mold and the resin. The membrane is separated from the polymeric network to expose the superhydrophobic surface of the appliance with re-entrant structures extend from the surface. Cure can be chemically or photochemically initiated. The membrane can be separated by delaminate the membrane from the appliances surface or by dissolving the membrane, such that the re-entrant features are exposed. The appliance can be rendered oleophobic or superoleophobic by the deposition of a perfluorinated hydrocarbon coating.

DETAILED DISCLOSURE

Figure 1:
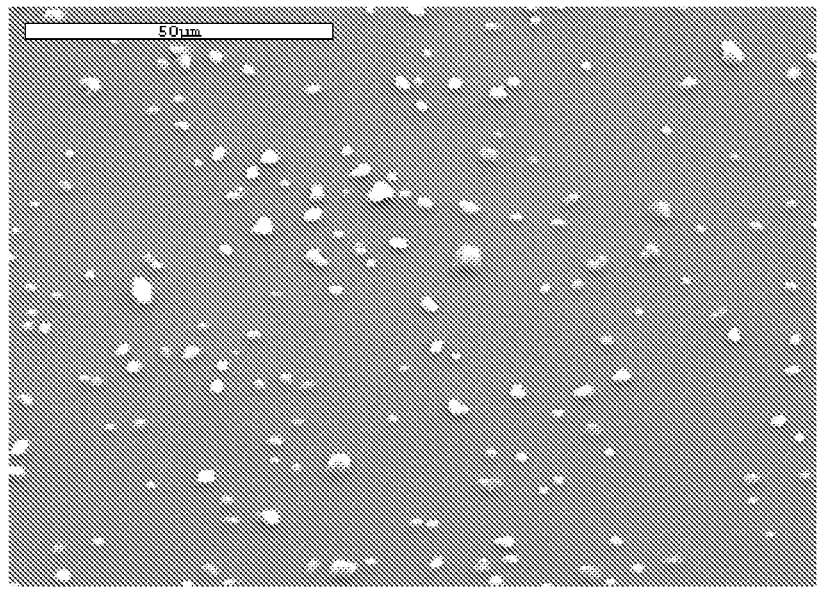
FIG. 1 shows a scanning electron microscope (SEM) image of a polydimethylsiloxane hydrophobic surface formed using a 1.2 µm membrane and peeling the membrane from the surface, according to an embodiment of the invention.

Embodiments of the invention are directed toward appliances having at least one superhydrophobic surface and a method to prepare the article. The surface possesses a topography that includes re-entrant features that range from 10 nm through 100 µm in size. The method involves placement of a polymeric precursor to a physical or chemical polymeric network on a membrane having pores that proceed from one large face of the membrane to the other large face of the membrane, where the pores have dimensions that are desired for the re-entrant features and forcing polymer network precursor into the pores. Subsequently, the polymer precursor is cured into a polymeric network. After curing, the membrane is removed by peeling the polymeric network from the membrane or dissolving the membrane to expose reentrant features on the surface resulting from the removal of the membrane. The superhydrophobic surface made in this manner can be converted to superhydrophobic and oleophobic surface by rendering the surface amenable to modification, for example, by oxidation of the surface, and treating the modified surface with a functional fluorinated hydrocarbon.

In an exemplary embodiment of the invention, the polymeric network of the superhydrophobic article is a polydimethylsiloxane network formed by an addition cure. In an embodiment of the invention, the method of forming the polymeric network is by an addition crosslinking of a polymer precursor. The polymer precursor must be of a sufficient viscosity such that it does not readily flow into and through a membrane when a pressure differential is applied to the interface of the membrane and resin, yet permit filling of at least a portion of the pores of a membrane when forced into the pores. Although the minimum viscosity of the polymeric precursor depends inversely on the size of the pores and the mode used to force the polymer precursor into the pores of the membrane, the minimum viscosity can be, for example, 1000 cps for a pore size of 1.2 µm when the polymer precursor is drawn into the pores by imposing a vacuum to draw the polymeric precursor upward, against gravity, into the pores. For any mode of infusion into the pores, the viscosity can be identified by blending a very high viscosity polymer of the type desired with a very low molecular weight polymer of the same structure and testing the infusion with differing proportions until an ideal viscosity is identified at a desired temperature for infusion. The temperature is limited by the melting temperature or glass transition temperature of a membrane employed to form the re-entrant structures and by the curing rate of the resin.

Curing of the polymeric precursor can be thermal or photochemical curing. For example, the polydimethylsiloxane polymeric precursor can be cured by a hydrosilation reaction between vinyl units and silicon-hydrogen units within the polymeric precursor. The polydimethylsiloxane can be filled with a reinforcing material, for example, silica fillers, for example, fumed silica, colloidal silica, or other metal oxide, for example, alumina or titania. The particle size of the filler is matched to the pore size of the membrane used to impart the re-entrant structure to the surface of the polymeric network, where the particle size is less than the pore size. The pore size of the membrane can be about 100 µm or less, for example, less than about 50 µm, less than about 40 µm, less than about 30 µm, less than about 20 µm, or less than about 10 µm. For purposes of the invention, "about" implies a variance of up to 10%. To form the superhydrophobic surface, the polydimethylsiloxane polymer precursor is placed in contact with the porous membrane, which is constructed of a material that can be dissolved in a solvent, for example, but not limited to, a polycarbonate membrane or a cellulose ester membrane, or where the polymeric network can be peeled from the membrane, where the peel-able membrane can be a soluble polymer, insoluble polymer, polymer network, or a ceramic. Generally, but not necessarily, the re-entrant structures exposed upon peeling require larger dimensions than do re-entrant structures exposed by dissolution of a membrane. The polymer precursor is forced into the pores of the membrane by either placing a pressure on the polymer precursor side of the interface or reducing the pressure on the membrane face distal to the polymer precursor. The pressure can be imposed on the polymer precursor as a positive gas pressure or mechanically by a press where the contacting surface of the press does not adhere to the polymer precursor, and/or the cured polymeric network. After curing of the polymeric network the membrane can be separated from the superhydrophobic article or a pre-superhydrophobic article that can be functionalized to impart superhydrophobicity.

The polymeric network can be friable to a degree where re-entrant features remain, although the features may be of differing dimensions and/or quantity, yet the surface remains superhydrophobic. The failure strain rates for the cured polymer can range from about 5% to 700%. For purposes of the invention, "about" implies a variance of up to 10%. The polymeric precursor can be a commercially available system or can be synthesized to have specific desired functionality for specific curing behavior, for specific bulk properties, or specific surface properties of the superhydrophobic article or pre-superhydrophobic surface. The polymeric network is an elastomer. The elastomer can be a chemically crosslinked elastomer or a thermoplastic-elastomer where the effective crosslinking is due to minority thermoplastic aggregates in an elastomer continuum. In this manner, the surface can be distorted within the elastic limits of the material used as the polymeric network when an impinging force is applied, whereas the feature extends from and returns to at least an approximation of its original shape. In this manner, the durability is much greater than that of inherently plastic materials, which will either distort irreversibly in shape or fracture upon deformation. In addition to polydimethylsiloxanes, other elastomers that can be formed as the superhydrophobic article include, for example, fluorinated polybutadienes, fluorinated poly(isoprenes), fluorinated butyl rubber, fluorinated EPM rubber, fluorinated elastomers (Viton®), other fluorinated elastomers, or other elastomers that can be fluorinated after curing. For example, a polybutadiene polymeric precursor can be infused into the pores of a membrane, cured, separated as a pre-superhydrophobic article, and fluorinated using a $CF_4$ plasma to yield a superhydrophobic article.

Once a superhydrophobic article is formed, reaction chemistry can be carried out on the superhydrophobic surface in a manner where the surface properties can be modified independently of the bulk material. For example, with a polydimethylsiloxane network, the surface can be oxidized to produce a plurality of surface hydroxyl groups from a portion of the surface methyl groups and treating with a silane coupling agent, for example, a perfluorinated hydrocarbon comprising silane coupling agent, such that the modified surface becomes superhydrophobic and oleophobic or superoleophobic. The perfluorinated hydrocarbon silane coupling agent can be any perfluoroalkane comprising silane coupling agent where a perfluorinated $C_3$ to $C_{18}$ alkane is coupled through a $C_2$-$C_3$ alkylene bridge to a silicon atom that is substituted with 0-2 methyl groups and 3-1 halo, alkoxy, alkyl or dialkylamino, or alkylcarboxy groups, for example, $R_{(3-y)}X_ySiCH_2CH_2C_nF_{(2n+1)}$ where n is 1 to 16, y is 1 to 3 and R is $C_1$-$C_3$ alkyl and X is Cl, Br, I, methoxy, $C_2$ to $C_5$-alkoxy, methylamino, $C_2$ to $C_5$-alkylamino, dimetylamino, di-($C_2$ to $C_5$-alkyl)amino, acetoxy, or $C_3$-$C_5$-alkycarboxy can be used as the coupling agent. Specific perfuorinated hydrocarbon silane coupling agents that can be used include: heptafluoro-1,1,2,2-tetrahydropentyltrimethoxysilane, undecafluoro-1,1,2,2-tetrahydroheptylacetoxydimethyl-silane, pentadecafluoro-1,1,2,2-tetrahydrononyl-bis-(dimethylamino)methylsilane, and heptadecafluoro-1,1,2,2-tetrahydrodecyltrichlorosilane.

Methods and Materials

Commercial track etched polycarbonate (PC) membranes (Isopore, Millipore, Inc.) were used as a mold for casting hairy plastron surfaces as the re-entrant features. The PC membranes had pore sizes of 1.2 or 3 μm. A commercial polydimethylsiloxane elastomer formulation (Sylgard 184, Dow Corning Inc) was used as the polymeric precursor for the superhydrophobic appliance. A blend having a weight of ratio 10:1 Sylgard 184 polymer base and Sylgard 184 curing agent was mixed, degassed, cast on a polyethylene terephthalate sheet and further degassed. A PC membrane was then placed on the polymeric precursor and a vacuum of 122 Torr until no bubbles could be observed in the polymer precursor. The polymeric precursor was cured into the polymeric network at 80° C. over a period of 15 hours. A hairy superhydrophobic surface was produced by peeling the PC membrane from the silicone network or by dissolving the PC membrane. The PC membrane dissolved at room temperature in dichloromethane and excess dichloromethane was removed by contacting the membrane with isopropanol. The hairy plastron PDMS surface was dried at 60° C. overnight.

Figure 2:
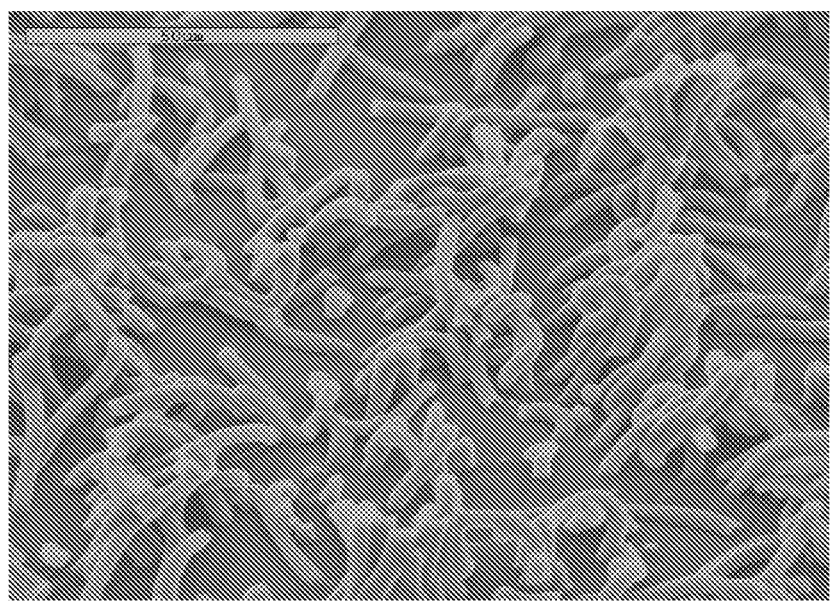
FIG. 2 shows a SEM image of a polydimethylsiloxane superhydrophobic surface, according to an embodiment of the invention, formed using a 3 µm membrane and peeling the membrane from the surface, according to an embodiment of the invention.

The 1.2 μm and 3 μm reentrant feature superhydrophobic surfaces that were generated by peeling displayed a non-uniform distribution of features. The 1.2 μm surfaces displayed short stubs instead of long features, as is shown in FIG. 1. The re-entrant features were sheared from the surface at varying short lengths as the force applied during peeling appeared to have exceeded the fracture strength of the 1.2 μm features. In contrast, as shown in FIG. 2, the mechanical strength of 3 μm features peeled from the membrane with 3 μm pores is sufficient to release the features without catastrophic fracturing, although some shortened features are observed.

Figure 3A:
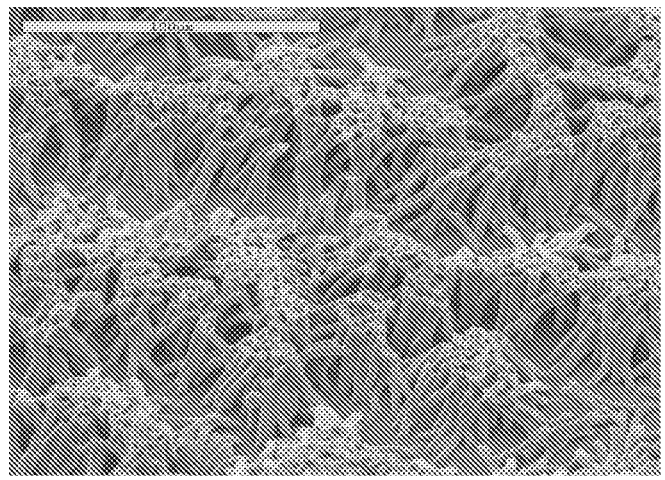
FIGS. 3A-C show SEM images of a polydimethylsiloxane superhydrophobic surface, according to an embodiment of the invention, at increasing magnification, displaying size bars of FIG. 3A 100, FIG. 3B 50, and FIG. 3C 20 µm, where the surface was formed using a 3 µm membrane and isolated by dissolving the membrane, extracting the solvent for dissolving, and drying, according to an embodiment of the invention.
Figure 3B:
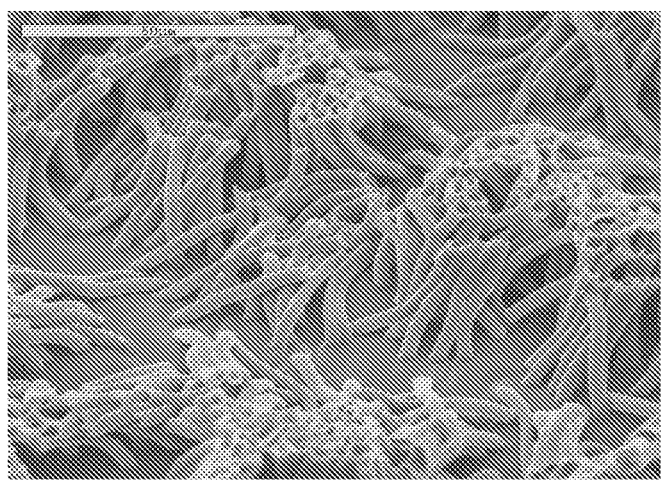
Figure 3C:
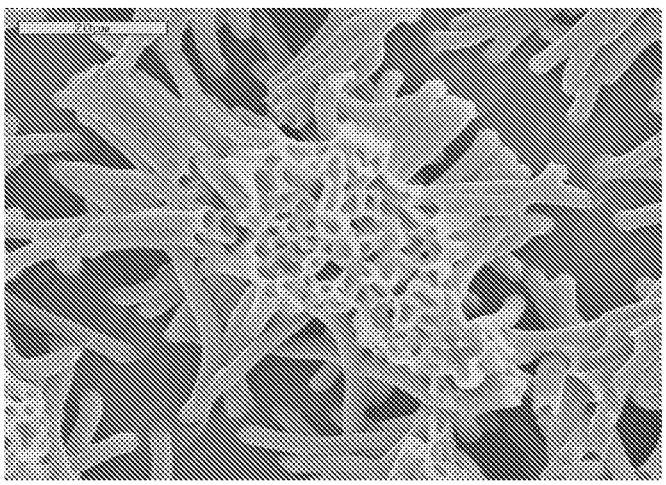

The superhydrophobic surfaces with the 1.2 μm and 3 μm re-entrant features were exposed without the imposition of shear by dissolving the PC membranes at room temperature in dichloromethane, extracting dichloromethane from the swollen network using isopropanol, and allowing the article to dry at 60° C. overnight. As can be seen in FIG. 3 for the 3 μm features, the re-entrant feature remains intact as evident from the concave tops on all of the cylindrical features.

Figure 4A:
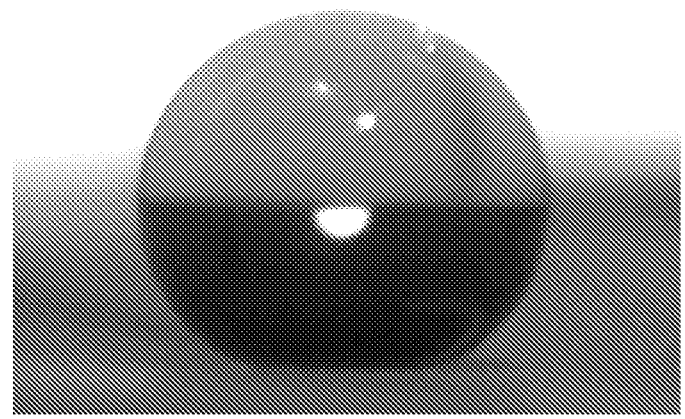
FIGS. 4A-B shows SEM images of FIG. 4A, a water droplet and FIG. 4B, an olive oil droplet, on a surface fluorinated polydimethylsiloxane superhydrophobic and oleophobic appliance, according to an embodiment of the invention.
Figure 4B:
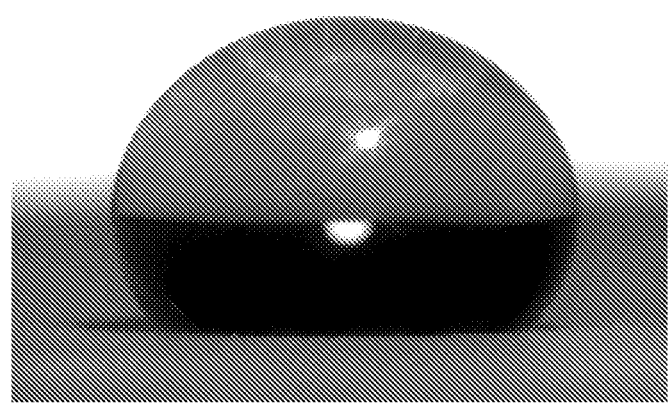

The superhydrophobic surfaces were rendered oleophobic in a two step process. First the samples were rendered hydrophilic by exposure to a an oxidizing mixture of $H_2O$:HCl:$H_2O_2$ (5:1:1 by volumetric ratio) using the method of Sui et al., *Analytical Chemistry* 2006, 78, 5543-51 and treating the oxidized surface with heptadecafluoro-1,1,2,2-tetrahydrodecyltrichlorosilane using the method of Tuteja et al., *Science* 2007, 318, 1618-22. The oleophobic surfaces appear to display a very weak metastable Cassie-Baxter state, (Cassie et al. *Transactions of the Faraday Society* 1944, 40, 546-50). The weakness is gauged qualitatively by the change in refractive index that is apparent by a initially shimmering interface on deposition of an olive oil droplet and a transition to the wetted Wenzel state (Wenzel, *Industrial and Engineering Chemistry* 1936, 28, 988-94 and Gao et al. *Langmuir* 2009, 25, 14105-15) where the apparent shimmer disappears. Water and olive oil droplets pin at the triple phase contact interface with high contact angles are shown in FIG. 4A and FIG. 4B, respectively.

Resistance to wear upon rough manual handling and scraping with a nylon brush was observed for the superhydrophobic surfaces, The resistance is attributed to the elastomeric nature of the cured polymer network, because the re-entrant features are able to undergo physical deformation and return to the original state through the retractive forces induced by the crosslinked elastomeric matrix and the initial favourable entropic configuration. Even though some fracture of the surface features is observed, the surface shows little decrease in the water contact angle, and remains superhydrophobic.

All publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A superhydrophobic appliance, comprising
   a polydimethylsiloxane network, the polydimethylsiloxane network having elastomeric properties and comprising at least one surface with a multiplicity of re-entrant features,
   wherein the multiplicity of re-entrant features render the at least one surface superhydrophobic,
   wherein the re-entrant features have at least one dimension of 100 μm or less,
   wherein the re-entrant features comprise non-perpendicular cylinders extending from a base of the at least one surface, and
   wherein the polydimethylsiloxane network comprises a plurality of reinforcing metal oxide particles dispersed therein, each of the plurality of reinforcing metal oxide particles having a particle size less than about 100 μm.

2. The superhydrophobic appliance according to claim 1, further comprising a monolayer on the at least one surface, wherein the monolayer comprises a fluorocarbon, and wherein, in addition to being superhydrophobic, the at least one surface is oleophobic.

3. The superhydrophobic appliance according to claim 2, wherein, in addition to being superhydrophobic, the at least one surface is superoleophobic.

4. The superhydrophobic appliance according to claim 1, wherein each of the multiplicity of re-entrant features has a homogeneous composition through any cross-section thereof, and wherein the homogeneous composition is the same as that of the polydimethylsiloxane network.

5. The superhydrophobic appliance according to claim 1, wherein the polydimethylsiloxane network is produced by a process comprising:
   providing a membrane comprising a multiplicity of pores;
   providing a polydimethylsiloxane precursor, the polydimethylsiloxane precursor comprising the plurality of reinforcing metal oxide particles;
   contacting the polydimethylsiloxane precursor and a face of the membrane that accesses the pores;
   forcing the polydimethylsiloxane precursor into the pores;
   curing the polydimethylsiloxane precursor into the polydimethylsiloxane network; and
   separating the membrane from the polydimethylsiloxane network to expose the at least one surface with the multiplicity of re-entrant features.

6. A method of preparing a superhydrophobic appliance according to claim 1, comprising:
   providing a membrane comprising a multiplicity of pores;
   providing a polydimethylsiloxane precursor, the polydimethylsiloxane precursor comprising the plurality of reinforcing metal oxide particles;
   contacting the polydimethylsiloxane precursor and a face of the membrane that accesses the pores;
   forcing the polydimethylsiloxane precursor into the pores;
   curing the polydimethylsiloxane precursor into the polydimethylsiloxane network; and
   separating the membrane from the polydimethylsiloxane network to expose a superhydrophobic surface of the superhydrophobic appliance.

7. The method according to claim 6, wherein the polydimethylsiloxane precursor is a hydrosilation curable resin.

8. The method according to claim 6, wherein curing is a thermal curing or a photochemical curing.

9. The method according to claim 6, wherein separating is peeling the membrane from the polydimethylsiloxane network.

10. The method according to claim 6, wherein separating comprises dissolving of the membrane in a solvent and removing the solvent residual on and/or absorbed within the superhydrophobic appliance.

11. The method according to claim 6, further comprising modifying the superhydrophobic surface to have a perfluorinated hydrocarbon coating on the polydimethylsiloxane network, wherein the superhydrophobic surface is a superhydrophobic and oleophobic or superoleophobic surface.

12. The method according to claim 11, wherein modifying comprises oxidizing the superhydrophobic surface to an oxidized surface and reacting the oxidized surface with a perfluorinated hydrocarbon silane coupling agent.

13. The method according to claim 12, wherein oxidizing comprises treating with a mixture of $H_2O$, $HCl$, and $H_2O_2$ and wherein the perfluorinated hydrocarbon silane coupling agent is heptadecafluoro-1,1,2,2-tetrahydrodecyltrichlorosilane.

* * * * *